United States Patent
Rogers et al.

(10) Patent No.: US 8,270,410 B2
(45) Date of Patent: Sep. 18, 2012

(54) SAMPLING TECHNIQUES

(75) Inventors: Daniel J Rogers, Redmond, WA (US); William R Hoffman, Redmond, WA (US); Marc A Power, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/290,139

(22) Filed: Nov. 30, 2005

(65) Prior Publication Data

US 2007/0030853 A1 Feb. 8, 2007

Related U.S. Application Data

(60) Provisional application No. 60/705,410, filed on Aug. 4, 2005, provisional application No. 60/714,813, filed on Sep. 6, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. .............. 370/395.21; 370/241; 370/252; 370/253

(58) Field of Classification Search ............ 370/395.21, 370/241–253; 455/436
See application file for complete search history.

(56) References Cited

U.S. PATENT DOCUMENTS

| | | | | |
|---|---|---|---|---|
| 5,867,483 | A * | 2/1999 | Ennis et al. .................. | 370/252 |
| 6,895,438 | B1 * | 5/2005 | Ulrich ........................... | 709/227 |
| 7,058,704 | B1 * | 6/2006 | Mangipudi et al. .......... | 709/223 |
| 7,231,445 | B1 * | 6/2007 | Aweya et al. ................ | 709/226 |
| 7,620,680 | B1 | 11/2009 | Lamport | |
| 2002/0089936 | A1 * | 7/2002 | Givoly ......................... | 370/252 |
| 2003/0069018 | A1 * | 4/2003 | Matta et al. .................. | 455/436 |
| 2003/0096597 | A1 * | 5/2003 | Kar-Kin Au et al. ......... | 455/412 |
| 2004/0162901 | A1 * | 8/2004 | Mangipudi et al. .......... | 709/225 |
| 2004/0212639 | A1 | 10/2004 | Smoot et al. | |
| 2004/0215724 | A1 | 10/2004 | Smoot et al. | |
| 2004/0257985 | A1 * | 12/2004 | Sahai et al. .................. | 370/229 |
| 2006/0031268 | A1 | 2/2006 | Shutt et al. | |
| 2006/0091851 | A1 * | 5/2006 | Kim .............................. | 320/112 |
| 2006/0092851 | A1 * | 5/2006 | Edlund et al. ................ | 370/252 |

(Continued)

OTHER PUBLICATIONS

U.S. Appl. No. 10/606,626, filed Jun. 25, 2003, to Delia et al., titled "Lookup Partitioning Storage System and Method".

(Continued)

Primary Examiner — Hassan Phillips
Assistant Examiner — Lonnie Sweet
(74) Attorney, Agent, or Firm — Lee & Hayes, PLLC (57) ABSTRACT

Embodiments of sampling techniques for server farms are described herein. In an implementation, the sampling techniques may be performed to find a range of values, in which, a quality of service measurement belongs. Each range is thought of as a "bucket" and may include a corresponding counter that is incremented for each quality of service measurement that falls within the bucket. The countes may then be converted into measurement curves which are published at periodic intervals for examination.

14 Claims, 5 Drawing Sheets

U.S. PATENT DOCUMENTS

| | | |
|---|---|---|
| 2006/0095969 A1* | 5/2006 | Portolani et al. ............... 726/23 |
| 2006/0155781 A1 | 7/2006 | MacCormick et al. |
| 2006/0282481 A1 | 12/2006 | Zhou et al. |
| 2007/0088703 A1 | 4/2007 | Kasiolas et al. |
| 2007/0282806 A1 | 12/2007 | Hoffman et al. |
| 2007/0294387 A1* | 12/2007 | Martin ........................ 709/224 |
| 2008/0313496 A1 | 12/2008 | Prabhakaran et al. |

OTHER PUBLICATIONS

U.S. Appl. No. 09/714,406, filed Nov. 16, 2000.

U.S. Appl. No. 12/257,747, filed Oct. 24, 2008.

U.S. Appl. No. 12/257,786, filed Oct. 24, 2008.

* cited by examiner

SAMPLING TECHNIQUES

RELATED APPLICATIONS

The present application claims priority under 35 U.S.C. §119(e) to U.S. Provisional Patent Application No. 60/705,410 filed Aug. 4, 2005 and U.S. Provisional Patent Application No. 60/714,813 filed Sep. 6, 2005, the entire disclosures of which are hereby incorporated by reference in their entirety.

BACKGROUND

Server farms have become increasingly common to provide vast amounts of computing resources. For example, server farms may be utilized to provide a wide variety of services, such as to store and retrieve data (e.g., a storage system), process financial data, route and store email, communicate instant messages, provide authentication services, output web pages, and so on. As the amount of computing resources desired in providing these services increases, the server farm may be "scaled out" by adding additional computers thereby providing a flexible topology in which additional resources may be added "as needed".

Capturing transaction processing performance in such systems, however, makes determining aggregate quality of service (QoS) of the server farm difficult. Additionally, when QoS falls below targets, determining whether or not the cause of the service quality problem is related to a subset of the farm is difficult as well. Further, because collections of server farms (i.e., clusters) are used to service enormous transaction loads (e.g., in billions), capturing QoS data and being able to segregate the information is also difficult to accomplish.

SUMMARY

Sampling techniques are described. The sampling techniques, for example, may be performed to find a range of values, in which, a quality of service measurement belongs. Each range may be thought of as a "bucket" and may include a corresponding counter that is incremented for each quality of service measurement that falls within the bucket. The counters may then be converted into measurement curves which are published at periodic intervals for examination, such as to locate a monitoring event, for presentation to a user, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Service quality for large scale internet services may be monitored using reported metrics from representatives in various areas such as development, operations, marketing and product management. Typically, metrics may measure customer impacting incidents and quality of service. For example, the number of service calls received over one weekend, and availability numbers.

Running a large scale service, for instance, such as one with more than 5,000 servers behind the scenes, may make boiling performance down to simple numbers difficult. In another instance, managing a service that provides hundreds of millions of accounts by percentages may be less than effective because a significant portion of the detail may be hidden behind the numbers. For example, a seemingly large number of service calls may represent only a small percentage of total service and thus determining if a problem exists may be difficult.

In a further instance, web service architecture may have various server roles, such as a three volume server roles including front end web servers, middle tier transaction servers, and back end storage servers. In this instance, the web servers talk to the middle-tier servers using a custom message protocol with each message defining an atomic unit of work against the back end stores. Load balancers and many copies of the front end and middle tier servers are used to handle the extremes of user traffic. A typical web page refresh, for instance, may result in a number of sequenced transaction requests from the web server through the load balanced middle tier servers with no session affinity between a given page paint and the middle tier servers. Clusters (e.g., groups of thousands of servers) may be used to partition the site and allow incremental growth to be managed, e.g., ten million accounts per cluster. Individual accounts may have cluster and store affinity within the cluster so that a given account is always found on a given virtual store.

Accordingly, simplifying availability to represent the quality of service may be difficult. Previous techniques created test accounts and used automated agents to simulate user transactions. However, with dozens of clusters and hundreds of stores per cluster, getting a feel for how well the site or parts of the site were running meant scaling to thousands of test user accounts and increasing the number of simulation sessions. Thus, over time, a measurement infrastructure based on simulated sessions and test accounts may be a costly burden. For example, each new cluster may use hundreds of additional test accounts; each test account may use their own passwords which may be expired/cycled monthly; session simulators are updated when new stores and test accounts are added; and so on. Thus, in this example additional simulation servers are then added to handle the simulation session load and as the service grows, false negatives become a problem when failures in the simulation infrastructure trigger problem reports against the service. Additionally, simulation does not provide visibility into the contribution that failures in each layer in the architecture have in detracting from the overall user experience and does not show if any specific transaction types were more problematic than others. Thus, as a web service is scaled up, traditional session simulators may not provide an acceptable measure of service availability.

Techniques are described in which samples are taken of transactions performed by a server farm. The samples may be configured in a variety of ways, such as quality of service measurements. The samples are then categorized into a range of pre-defined values, in which, a quality of service measurement belongs. Each range may be thought of as a "bucket" and may include a corresponding counter that is incremented for each quality of service measurement that falls within the bucket. The counters may then be converted into measurement curves which are published at periodic intervals for examination, such as to locate a monitoring event, for presentation to a user, and so on.

In the following discussion, an exemplary environment is first described which is operable to use sampling techniques. Exemplary procedures are then described which may be employed in the exemplary environment, as well as in other environments.

Exemplary Environment

Figure 1:
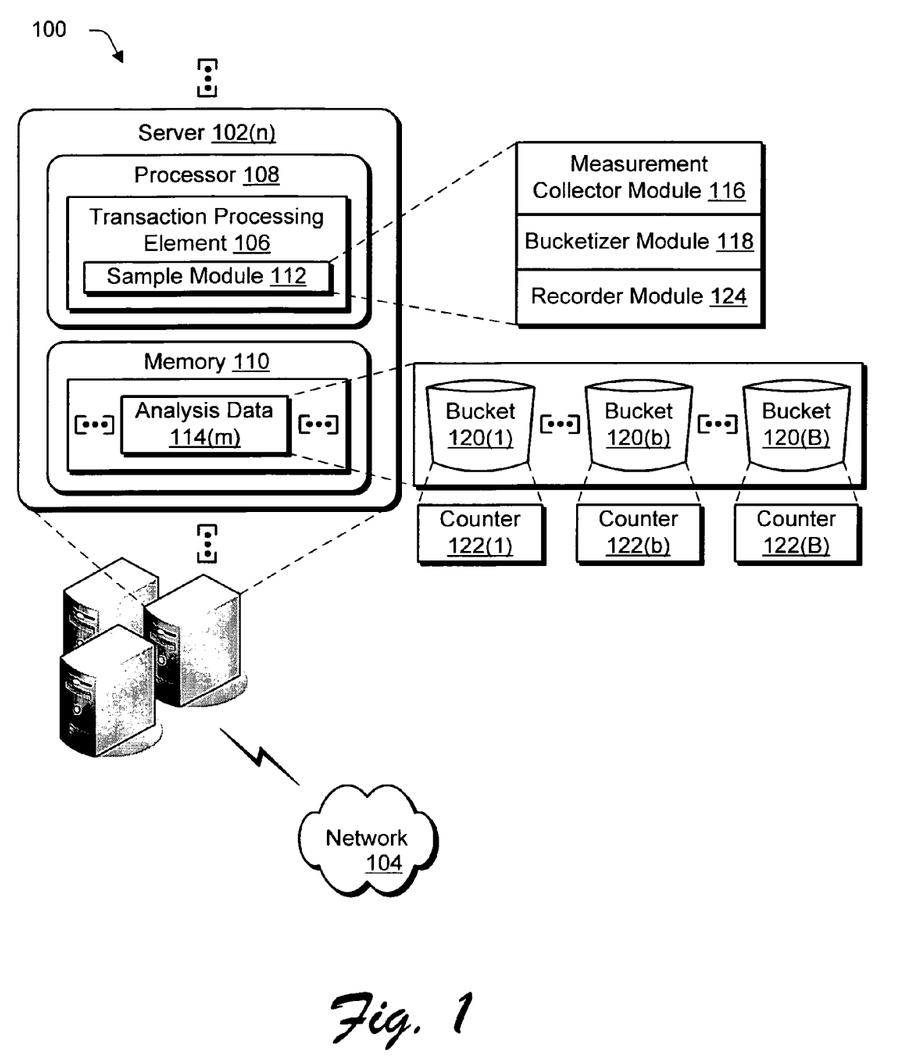
FIG. 1 illustrates an environment in an exemplary implementation that is operable to employ sampling techniques to manage storage systems.

FIG. 1 illustrates an environment 100 in an exemplary implementation that is operable to employ sampling techniques to manage storage systems. The environment includes one or more of servers 102(n) (where "n" can be any integer from one to "N") that are arranged to provide a server farm, i.e., a server cluster. As previously described, the servers 102(n) may be utilized to provide a wide variety of services, such as to process financial data, to communicate over at network 104 (e.g., to route and store email, communicate instant messages, provide authentication services, output web pages), and so on.

These services are provided by the servers 102(n) in the environment 100 of FIG. 1 through execution of a transaction processing element 106, which is illustrated as being executed on a processor 108 and is storable in memory 110. The transaction processing element 106 is representative of functionality to provide a desired operation of the servers 102(n), e.g., to serve web pages, communicate email, and so on.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110 is shown, a wide variety of types and combinations of memory may be employed, such as random access memory (RAM), hard disk memory, removable medium memory, and other types of computer-readable media.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

As previously described, it is generally difficult using traditional management techniques to manage operation of a relatively large server farm, e.g., having hundreds and thousands of servers. For example, statistical sampling is a technique employed by conventional monitoring systems in high volume scenarios. However, with large user populations (e.g., when a large number of users desire to access the server 102(n) over the network 104) and large server farms, statistical sampling becomes problematic due to the number of samples used to fully monitor the resources being managed.

A traditional approach used to manage operation of a server farm, for instance, includes the placement of sample data on each of the resources (e.g., servers 102(n), memory 110, and so on) being managed, and then creating artificial transactions from within the system to determine whether the dispersed sample data is accessible to the test transactions. One problem with this approach is that when the number of dispersed managed resources is large, such as in collections of server farms, this technique generally introduces a test data management burden in the operation of the system.

During periods of rapid growth, for instance, the creation of sufficient test data to cover the hardware being managed may cause operation of the server farm become both error prone and costly, which are characteristics that are undesirable in monitoring large systems. For example, error prone monitoring may lead to errors of a first and second order, such as by measuring a problem that does not exist or not measuring a problem that does exist. Thus, as the number of managed resources becomes relatively large (e.g., server farms with thousands of nodes in dozens or hundreds of clusters), statistical sampling typically fails under its own weight as monitoring layers are added to the monitoring systems, which therefore causes the server farm to become more error prone due to added complexity of the monitoring.

Management may also become increasingly difficult when transaction counts push into the billions per day range. An ideal quality of service (QoS) measure, for instance, may capture each failed transaction and calculate the failure(s) as a percentage of the transactions serviced. Statistical sampling, however, reduces the number of measurements that are captured and later counted and analyzed, and therefore also introduces a degree of uncertainty, which is represented by error. When high quality of service (such as 99.999%) is desired, introducing even a few points of error margin may make an accurate QoS determination difficult. Therefore, traditional techniques typically increased the sample size until an acceptable margin of error was calculable. However, a trade-off was encountered in that the number of samples that are taken and then stored may be overwhelming in terms of space and processing capability utilized to manage the sample data, especially when measuring QoS for billions of transactions.

The following example illustrates the number of samples that an exemplary system may generate using statistical sampling to illustrate the sample data volume problem. In this example, the exemplary system is a "small" system having a single node in its server farm, and that node processes a steady flow of thirty transactions per second. Additionally, in this example a decision is made by an operator to sample ten percent of the transactions such that the number of samples taken per day is equal to the number transactions per second multiplied by 86,400 and multiplied by the sample rate, which is illustrated as follows:

30 tps*86400 seconds in a day*10%=259,200 samples per day

Thus, as shown in the above expression, the number of samples may be reduced by lowering the total number of transactions processed, or by reducing the statistical sampling rate. The typical decision is to sample less frequently, since it us usually not a goal of a server farm to reduce the number of transactions being served. For determining QoS accurately, however, this represents a trade off between the amount of data that is analyzed to determine quality of service and the accuracy of the calculations.

In large scale systems, handling billions of transactions per day with hundreds of servers in a farm arrangement, sampling at low rates is typically not desirable. For example, it may be desirable to determine whether each of the components of the server farm (e.g., servers 102(*n*)) bears a corresponding portion of the transaction load. Thus, the amount of sample data may quickly grow to tens of millions of rows that are managed, moved and analyzed.

The transaction processing element 106 is illustrated as including a sample module 112 that is executable on the processor 108 (and storable in the memory 110) to collect sample data from the transaction processing element 106 and from the sampled data determine what transactions are "behaving well" (e.g., resource consumption wise) and which are not. In an implementation, the techniques employed by the sample module 112 perform the sampling and analysis without introducing further errors due to sampling and monitoring system complexity introduced by traditional techniques; may do so in a way that lets an operator control the size of the analysis data 114(*m*) without losing precision of QoS figures; present the data in a way that allows the service quality overall to be captured in a glance; and enables a way to "drill-down" or "fly thru" data to enable identification of specific resources and transaction types that are not performing adequately, each of which while providing the ability to calculate an overall QoS measure at the server, farm or cluster level.

For example, the sample module 112 may use an instrumented approach that captures the timings of each transaction (through execution of a measurement collector module 116) and tallies these timings (through execution of a "bucketizer" module 118) into configurable QoS categories 120(1), . . . , 120(*b*), . . . , 120(B) (i.e., buckets) over a specified period of time. Thus, each transaction may be measured while simultaneously reducing the size of the sample data set. As a result, the system processing capability used to capture and store the individual QoS measures may be scaled down to a manageable level without introducing inaccuracies in the QoS calculations or overburdening a high-transaction rate system with a large sample data storage processing overhead burden.

"Bucketizing" and "Egg-sorter" Algorithms

Algorithms employed by the sample module 112 to perform these techniques (e.g., execution of the bucketizer module 118) may utilize a variety of taxonomies, such as resource types and buckets. Resource types define a set of resources to be measured, e.g., response time, memory consumed, CPU costs, and so on. Each resource to be measured is associated with a set of buckets 120(1)-120(B). These buckets 120(1)-120(B) define the quality scale for each resource type, e.g., "excellent", "great", "meets SLA requirement", "poor", "failure", and so on. For example, each of the buckets 120(1)-120(B) may represent a range of values (e.g., from high to low) that represents the boundary of the buckets. In an implementation, the buckets 120(1)-120(B) are defined as a continuum such that gaps are not present "between" the buckets.

For example, the buckets 120(1)-120(B) may be defined to measure a resource type named "transaction response time". The names of the buckets 120(1)-120(B) for this resource type, for instance, may be defined as "excellent", "target", and "failed". To each of these, a value is assigned that represents a boundary between each category. For example, excellent response times could be any time less than 2 seconds. Target response times may be any response time greater than 2 seconds, but less than 3 seconds, and so on.

Reducing Sample Burden by Bucketizing Measurements

The "bucketizing" portion of the algorithm (i.e., the bucketizer module 118) employed by the sample module 112 may take the measurement for each transaction (e.g. response time) obtained by the measurement collector module 116 and find the bucket 120(1)-120(B), to which, the transaction belongs. This may be performed by comparing the transaction's measurement with the bucket 120(1)-120(B) boundaries. When a measurement fits within the range of a bucket 120(1)-120(B), a respective counter 122(1)-122(B) that corresponds to that bucket is incremented. These counters 122(1)-122(B) may also be referred to as the "bucket count", which tallies the number of transactions that fit within each respective bucket 120(1)-120(B).

In an implementation, at specified (configurable) intervals called the "measurement interval", the values for a set of buckets are published as a set through execution of a recorder module 124. This set may be referred to as a "measurement curve". The measurement curve represents the counts in each bucket for a specific transaction type and resource measurement at a specific time. Once the measurement curve data is published, the counters 122(1)-122(B) may be reset to zero for a subsequent measurement interval.

Double Buffering and Flush Intervals

In an implementation, "publication" is utilized to control a point in time, at which, the measurement curve data becomes visible. For example, if the values that make up the set were visible before the end of the measurement interval, the values could not be compared to other measurement curves that measure the same resource type for the same transaction. These could come from other parts of the server farm that are processing the same types of transactions, represent different points in time, and so on. Therefore, "publishing" performed upon completion of the measurement interval may work to normalize the measurement curve data for comparison purposes.

In order to avoid a performance degradation at the publishing interval (e.g., incurring the cost of writing a measurement curve to a database at the end of each publishing interval), the measurements for each transaction type may be buffered so that the measurements may be saved later as a larger set. Moving the aggregated set of measurement curve data to storage for later analysis is referred to as "flushing" in the following discussion. Flushing may occur at configurable intervals referred to as a "flush interval". Thus, the flushing mechanism operates as a second buffer that controls how much of the system's resources are spent saving the gathered measurements. Further discussion of flushing may be found in relation to FIG. 2. As is readily apparent, flushing gathered measurements for later analysis or reporting is optional.

The "Egg Sorter" Algorithm

Representing quality buckets as ranges may introduce additional complications. To continue now with the previous example, taking the sample may involve measuring the response time for each transaction and comparing that time against two values that represent the bucket, which may introduce both a processing burden and room for error in bucket definitions. If buckets were defined by listing two values, for instance, it may be possible for a user to wrongly configure a bucket set by leaving a gap between bucket ranges. This may result in potential loss of measurements if some transactions fell between the gaps of the buckets. To solve this problem, an "egg-sorter" algorithm may be employed by the sample module 112.

The metaphor referenced by the egg-sorter algorithm is to an egg sorter at a farm. Eggs are traditionally graded on size, and the egg sorter has a series of graduated holes that allow small eggs to fall into the first hole, and larger eggs to pass over the small holes until a hole that represents the standard for that grade is encountered. The holes in the egg sorter are arranged from smallest to large Applying this metaphor to the bucketing problem, error and the number of comparisons required to find the bucket, to which, a given measurement belongs may be reduced. To do this, each bucket 120(1)-120(B) may be defined to have a single edge that represents the value that a measurement must be less than to "fall within" the bucket. The last bucket in every quality bucket set is "failure", which may be used when a measurement does not "fall within" any other buckets. Further discussion of sorting may be found in relation to the following figures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the sampling and management techniques described below are platform-independent, meaning that the techniques may be implemented on a variety of commercial computing platforms having a variety of processors.

Figure 2:
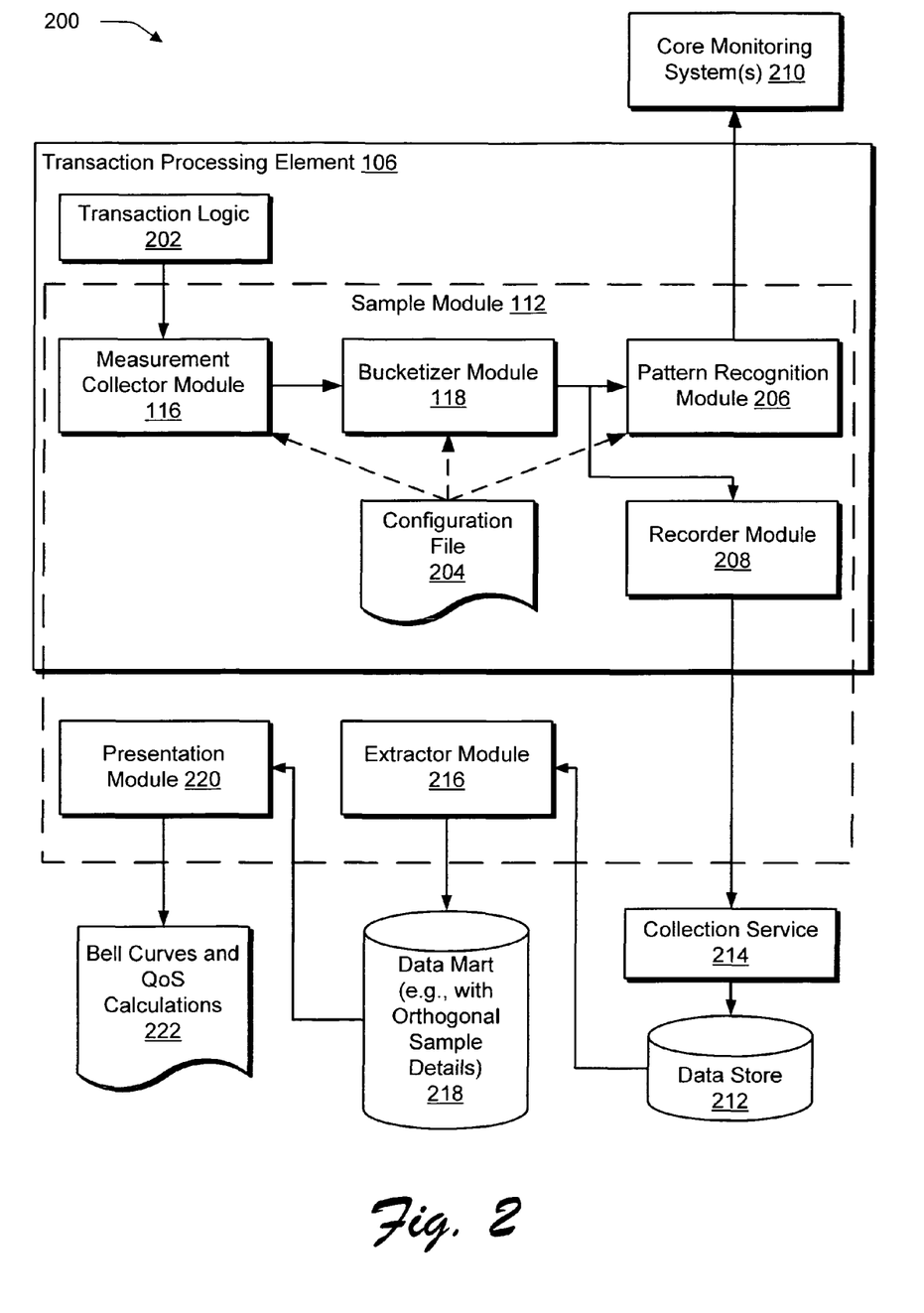
FIG. 2 is an illustration of a system in an exemplary implementation in which a transaction processing element and a sample module of FIG. 1 are shown in greater detail.

FIG. 2 illustrates a system 200 in an exemplary implementation showing the transaction processing element 106 and sample module 112 of FIG. 1 in greater detail. Since these techniques may be employed to capture measurement curve data from transaction processing elements 106 that are executed on computers arranged in server farms and clusters of server farms, the illustrated system 200 includes components that are shown as added to the transaction processing service element(s) 106 that are being measured. The system 200 also includes centralized parts that are shared by the transaction processing service elements 106. For existing or new systems, for example, the components that exist inside of the transaction processing service element 106 are applied at the start and stop of each set of software logic that constitutes the "begin" and "end" boundary for processing a specific transaction type by transaction logic 202. This can be done via a code change or via a set of common start-stop logic that is shared by all transaction types in the system being instrumented.

Measurement Collector Module 116

The measurement collector module 116 is called at the start of a transaction and again at the stop and provides an indication of the disposition (e.g., failed or succeeded) of a transaction performed by the transaction logic 202. The measurement collector module 116 is also executable to determine the resource measurement for the transaction, identify the transaction type, resource type, whether the transaction is known to have failed or not, and so on.

Configuration File 204

The configuration file 204 contains start-up settings that configure the transaction types of interest for the measurement collector module 116 to measure. The configuration file 204 may also be used to set bucketing boundaries for each transaction type analyzed by the bucketizer module 118. For example, the configuration file 204 may be automatically updated (e.g., changes made to bucket thresholds) to reflect monitored distribution of QoS measurements, updated QoS requirements (e.g., as set by an operator), and so on. Further, the configuration file 204 may also define value patterns that are to be monitored in real time by the pattern recognition module 206, further discussion of which may be found in relation to its respective heading.

Bucketizer Module 118

The bucketizer module 118 is responsible for examining the configuration file 204 to determine bucket boundaries for the specific transaction types measured by the measurement collector module 116 and then tally the transactions being measured into a respective bucket 120(1)-120(B) of FIG. 1. At a pre-configured interval and at a transaction boundary, the bucketizer module 118 may publish the measurement curve data for each of the transaction types for the current interval to the pattern recognition module 206 and a recorder module 208 simultaneously. The counts for each bucket are then reset to a zero value and a new measurement interval begins.

Pattern Recognition Module 206

The pattern recognition module 206 is responsible for "looking" at the measurement curve data output by the bucketizer module 118 for a monitored resource and determining if alerts and/or error reporting is to be performed by one or more core monitoring systems 210. Core monitoring systems 210 may be implemented in a variety of ways, such as an executable module that allows applications to raise events, record tracking data, and request operator intervention. In an implementation, the system interfaces with standard core monitoring system 210 directly by way of system application log entries.

Recorder Module 208

This component is responsible for providing the measurement curve data to a data store 212 at the end of a flush interval by calling a collection service 214 directly to pass the measurement curve data to be stored.

Collection Service 214

The collection service 214 component in the system 200 of FIG. 2 is illustrated as being configured to live "off-box" from the managed farm resources. For example, this component may provide a platform agnostic web service collection interface that assures that the data is stored in a way that is appropriate for an actual write-only store implementation.

Data Store 212

This component may be configured as a database that stores live system data. Because a substantial number of calls to the collection service 214 result in writes to this data store 212, with many rows per call, the data store 212 may be configured as "not directly query-able" (i.e., "write-only") to maintain an ability to "keep up" with traffic in systems that generate significant amount of sampling data, e.g., billions of sets of bucketed sampling data.

Extractor Module 216

The extractor module 216 is responsible for moving data from the data store 212 (which may be "write only" to the sample module 112 as previously described) to a data mart 218 (e.g., a query-able data store optimized for read) so that the bucketed performance data may be consumed without impacting the live system.

Data Mart 218

In an implementation, data is stored in the data mart 218 in a manner that allows n-dimensional aggregation of the self-consistent QoS data. It should be apparent that any number of dimensions may be aggregated by simple sum and the numbers that result are generally self-consistent and relevant to the QoS measurement along the selected axis.

Presentation Module 220

The presentation module 220 is executable to present results of processing of the QoS data. For example, the presentation module 220, when executed may output bell curves and QoS calculations 222 based on data from the data mart 218, e.g., through execution of spreadsheet graphing components.

Execution of each of these components of the system 200 of FIG. 2 will be further described in relation to the following exemplary procedures.

Exemplary Procedures

The following discussion describes sampling and management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
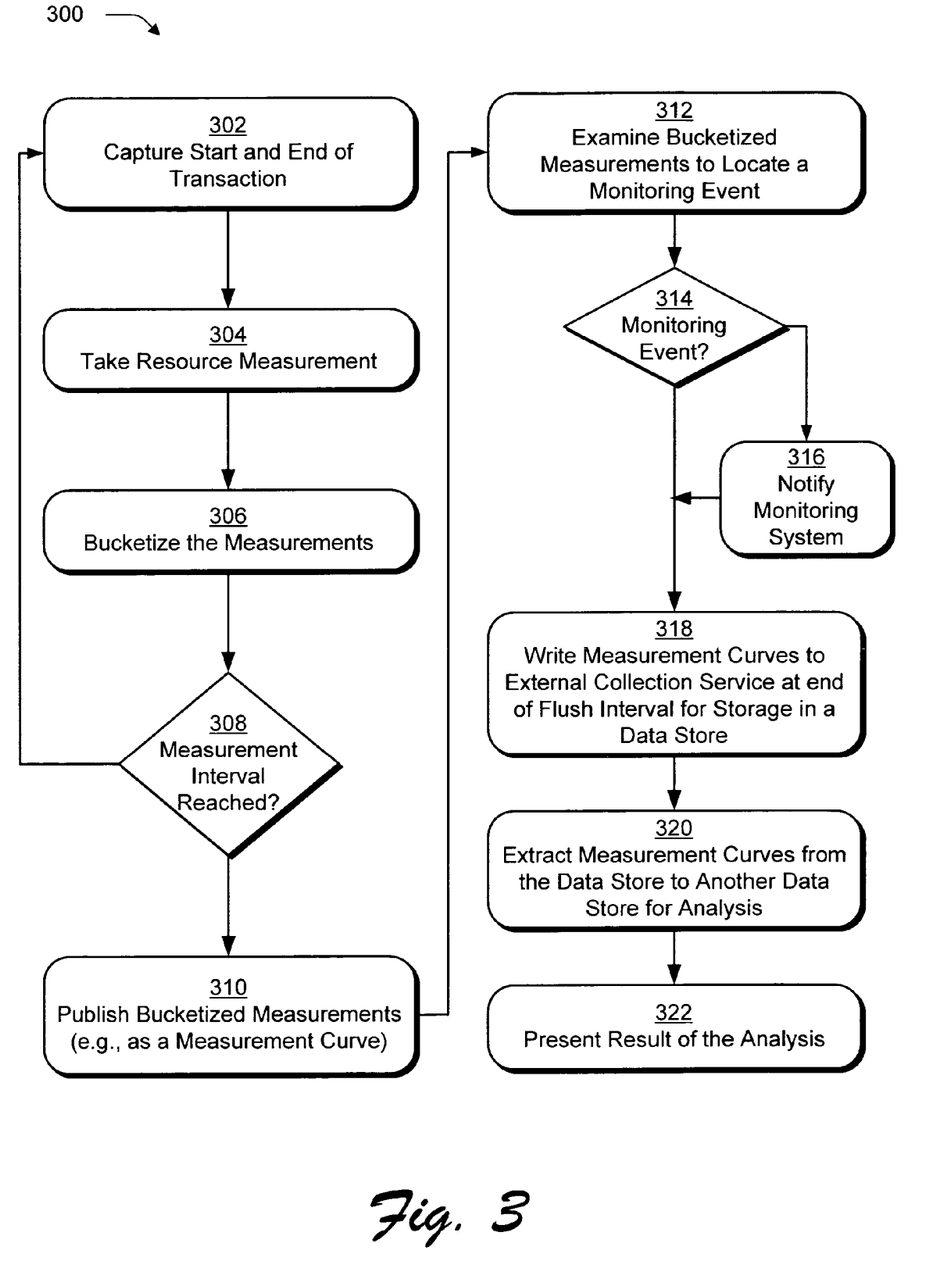
FIG. 3 is a flow diagram depicting a procedure in an exemplary implementation in which transaction monitoring is performed to analyze operation of a system.

FIG. 3 is a flow diagram depicting a procedure 300 in an exemplary implementation in which transactions monitoring is performed to analyze operation of a system. A start and an end of a transaction are captured (block 302). For example, transaction logic 202 of the transaction processing element 106 may perform a transaction to access data stored in a data store, execute a module to perform a function, and so on.

A resource measurement is then taken of the transaction (block 304). The measurement collector module 116, for instance, may determine how long the transaction took to perform, amount of data processed in the transaction, complexity of the transaction (e.g., amount of processing, memory, network resources utilized), and so on. The measurements are then "bucketized" (block 306). For example, each of the buckets may correspond to a category of the resource being measured, e.g., time taken to perform the transaction. The bucketizer module 118 may then be executed to determine which of the buckets (i.e., category) the transaction belongs. In an instance, the bucketizer module 118 uses an "egg sorter" algorithm such that each bucket has a single threshold and are arranged in a corresponding sequential order to improve efficiency of the categorization. In another instance, most buckets are defined by an upper and lower end of a range with the "end" buckets (at the end of the ranges) being define by a single or double edge. A variety of other instances are also contemplated.

A determination is then made as to whether a measurement interval has been reached (decision block 308). If not, ("no" from decision block 308), state and end of another transaction is captured (block 302). If so, ("yes" from decision block 308), the bucketized measurements are published (block 310), such as through use of one or more measurement curves. For example, the bucketized measurements from the bucketizer module 118 may be published to the recorder module 208 and the pattern recognition module 206.

The pattern recognition module may examine the bucketized measurements to locate a monitoring event (block 312), such as an event that would indicate a significant performance degradation, error, and so on in the transactions. When a monitoring event is detected ("yes" from decision block 314), a monitoring system is notified. For example, an external core monitoring system 210 may be notified to take appropriate action.

When a monitoring event is not detected ("no" from decision block 314) or after the monitoring system is notified (block 316), the measure curves are written to an external collection at the end of a flush interval for storage in a data store (block 318). For example, the collection service 214 may write the measurement curves to a "write-only" data store 212, meaning that the data store is not generally queryable by the collection service 214. For example, in large scale systems, the amount of data being flushed at any time may be quite significant. Therefore, in an implementation, the external store is not used for analysis, which is why it is labeled as write-only in this example. At periodic intervals, the measurement curves are extracted from the data store to another data store for analysis (block 320). This other data store may be optimized for "read" access to speed the analysis, much like the original data store is optimized for "write access". A result of the analysis may then be presented (block 322), such as through use of bell curves, QoS calculations, and so on.

Efficient management of large scale system monitoring and quality of service reporting involve the prevention of: loss of accuracy (e.g., introduced by statistical sampling methods); loss of coverage (e.g., introduced by using test data interspersed with live data); "scale" problems (e.g., the need to keep adding more sets of managed test data as more capacity is added); and to prevent the size of sample data from overwhelming the networking and disk resources.

In an implementation, a substantial simplification in the down-stream data analysis as well as a compression of the amount of QoS data (as compared to individual transaction timing) is achieved by bucketing each transaction for a duration of a measurement interval as well as through the inability to store an instance of a bucketed measurement which causes the current counts to be retained (or if desired, discarded).

The amount of data in the measurement curve sets may be determined in a variety of ways. For example, the amount of data is determined by a duration of the bucketing interval multiplied by the number of resources being monitored multiplied by the number of transactions. As the number of scale units (e.g., clusters and farms) increases, the total number of measurement curves may be managed by increasing/decreasing the measurement interval. For instance, this may be utilized to create a linear reduction in the number of samples stored without introducing the sampling errors associated with statistical sampling. As a follow up to the earlier sample count example, the same transaction rates yield a substantial reduction in quality management data.

Bucketing Via the Egg-Sorter Algorithm

In the following example, a two-minute-measurement interval having a 100% sample rate is applied as follows: the number of measurement curves taken per day (e.g., 86400) is divided by the measurement interval (e.g., 120) in seconds is equal to the number of samples (e.g., 720) per day. This represents a 360 times reduction in the amount of the data being gathered to manage quality of service versus the previous traditional example. Increasing the measurement interval to five minutes or ten minutes yields reductions of nine hundred and eighteen hundred times, respectively. This allows the number of rows of sample data to be engineered without introducing sampling errors. Since external transaction simulators or strategically placed sample data are not required, the resulting cost to manage a large scale system is improved considerably.

Measuring Quality in Complex Web Service Implementations

Complex products have complex quality goals. Therefore, for a web service it is important to determine the priority that customers place on a number of service quality measurements. In a web-based service, for instance, fit and finish may translate to look and feel, and consistency in execution may translate to how long it takes to perform user transactions such as to log in, find files or pages, delete, read, log out and so forth. If it takes too long, or behaves inconsistently, the customer may get frustrated. Likewise, if a customer experiences erratic behavior from their software, such as differing amounts of time to open an email, or if one operation is markedly slower than others, the customer's perception of service may be adversely affected. Thus, the timing of individual transactions and the consistency of that timing is an important measure in predictability of the user experience.

Statistical Service Management

Statistical Process Control techniques may be modified to provide a measure of performance in web based services. In an implementation, statistical measurement involves identifying the transactions that affect customer experience. Classifications may be applied to a number of service quality measurements at the transaction level. Performances criteria may be set for a variety of transaction types and may be used to distinguish a good experience from a bad experience at the transaction level, and avoid introducing uncertainty in the measurement. For example, performance data for different types of transactions may be classified into categories, such as "great", "good", "ok", "poor", and "bad". Each transaction type may be monitored for consistency in timing. Thus, a transaction time may be determined and based upon boundaries determined for an associated transaction type, the experience may be categorized.

Timing data for every transaction in a large scale web service may quickly add up to a large data management problem. Thus, data for every transaction may be stored in a directly meaningful and useable form. This may involve processing individual transaction and making the data available for collection.

In some instances, performance counters do not provide a suitable solution for exposing gradated measurements. For five gradations from "great" to "bad", for instance, five counters are used for each measurement to be exposed, which may add significant complexity. Further, tests with custom performance counters typically involved recreation each time the system is rebooted, which makes them fragile and error prone for exposing measurements.

Figure 4:
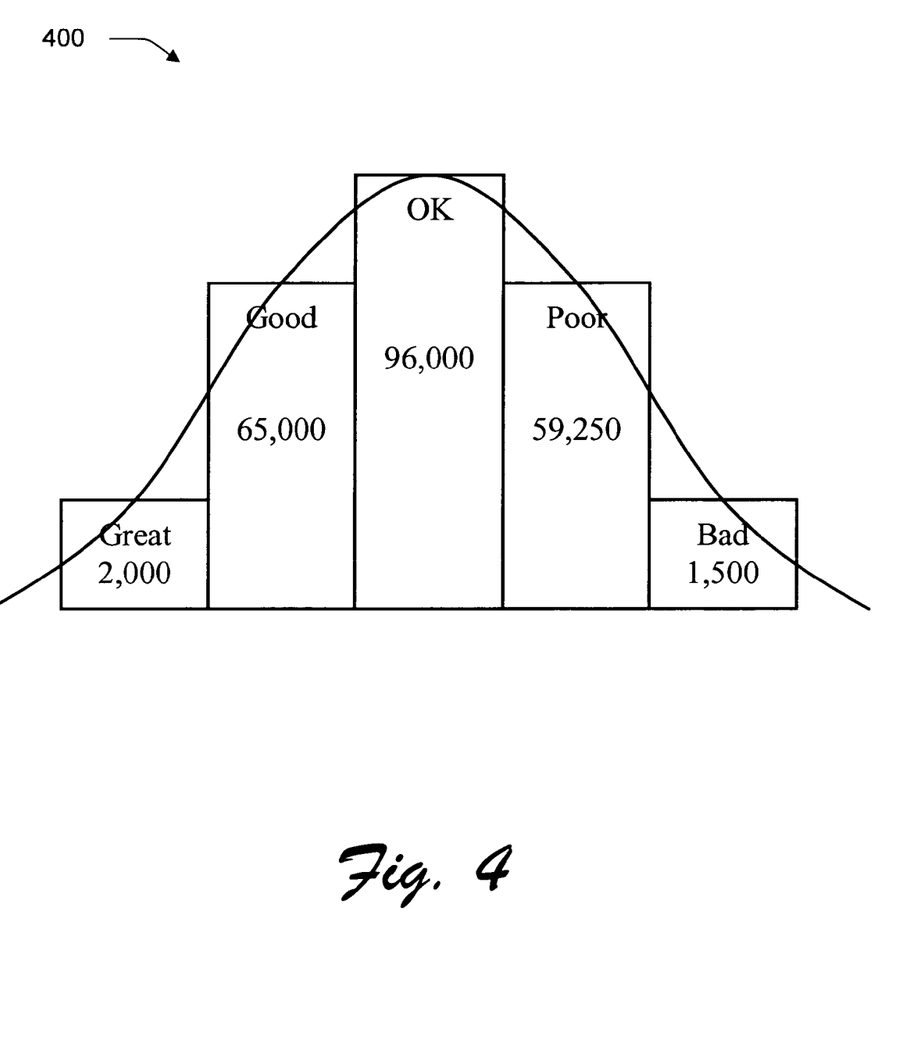
FIG. 4 is an illustration in an exemplary implementation in which a performance curve is employed to store data.

FIG. 4 illustrates an exemplary implementation in which a performance curve 400 is employed to store data in a directly meaningful and useable form. A performance curve, for instance, may be generated from the normal distribution of behaviors for a given transaction type and for a given period of time. Individual performance measurements may not be interesting by themselves due to the inherent randomness in complex systems. For example, when individual measurements are viewed alone, the measurements may not give a sufficient indication of problems. A performance curve may use defined ranges of values to represent different categories of behavior, such as "extremely good", "very good", "good", "poor" and "very poor". Individual transactions are sorted into each range over a fixed period of time, resulting in a small data sample that directly measures the behavior of a transaction type.

The performance curve 400 of FIG. 4 shows an example of a performance curve representing the aggregate transaction timings of a transaction type called "GetMessage" for a measurement interval of five minutes. The graphical representation is logical, as the data that is captured is a set of counts that represent the number of transactions completed within each timing range or category (i.e., bucket) within the measurement interval. Each such set of related measurements represents a single data point that is self consistent and represents the performance measurements for that transaction type for a period of time.

The individual data points represent counts that fell into a range of values, in this case response timings. As depicted in FIG. 4, one set of counts represents "OK" performance, while others represent "good", "poor", and so on. Timing boundaries associated with each category are used to divide the counts into the appropriate category (e.g., "great", "good", "ok", "poor", "bad"). These boundaries may be unique to each transaction type. In one implementation, boundaries are based on settings in a configuration file (e.g., configuration file 204) that is loaded when the measurement library is loaded. These boundaries may be pre-determined, updatable, or user defined. This combination of collecting the counts within a time interval and then making different ranges that represent different performance categories results in a substantial compression of data as compared to test account based sampling.

For instance, one row of data may include the transaction type, the time interval, and the five performance ranges (buckets), e.g., one row of measurement data may represent what would otherwise involve 223,750 individual timing data measurements as shown in the example of FIG. 4. That level of data compression makes managing a full sample strategy (e.g., 100% of transactions measured) feasible. Naturally, different sampling time intervals, (e.g., 2 minute or 10 minute intervals) may be used to adjust performance. The data compression for a service that handles a billion transactions a day may approach 85,000 to 1 at peak hour.

Data Availability

One aspect of measuring each transaction involves the overhead associated with the measurement. In an implementation, each of the collecting server types caches several intervals worth of data, and then periodically a background thread writes out the data to the collection store. This approach separates the storage of measurements from the collection of measurements. The storage thread then may make a single non-blocking web service call using one-way Simple Object Access Protocol (SOAP). In this manner, the curve measurement data may be written out to be saved, without blocking behavior.

Figure 5:
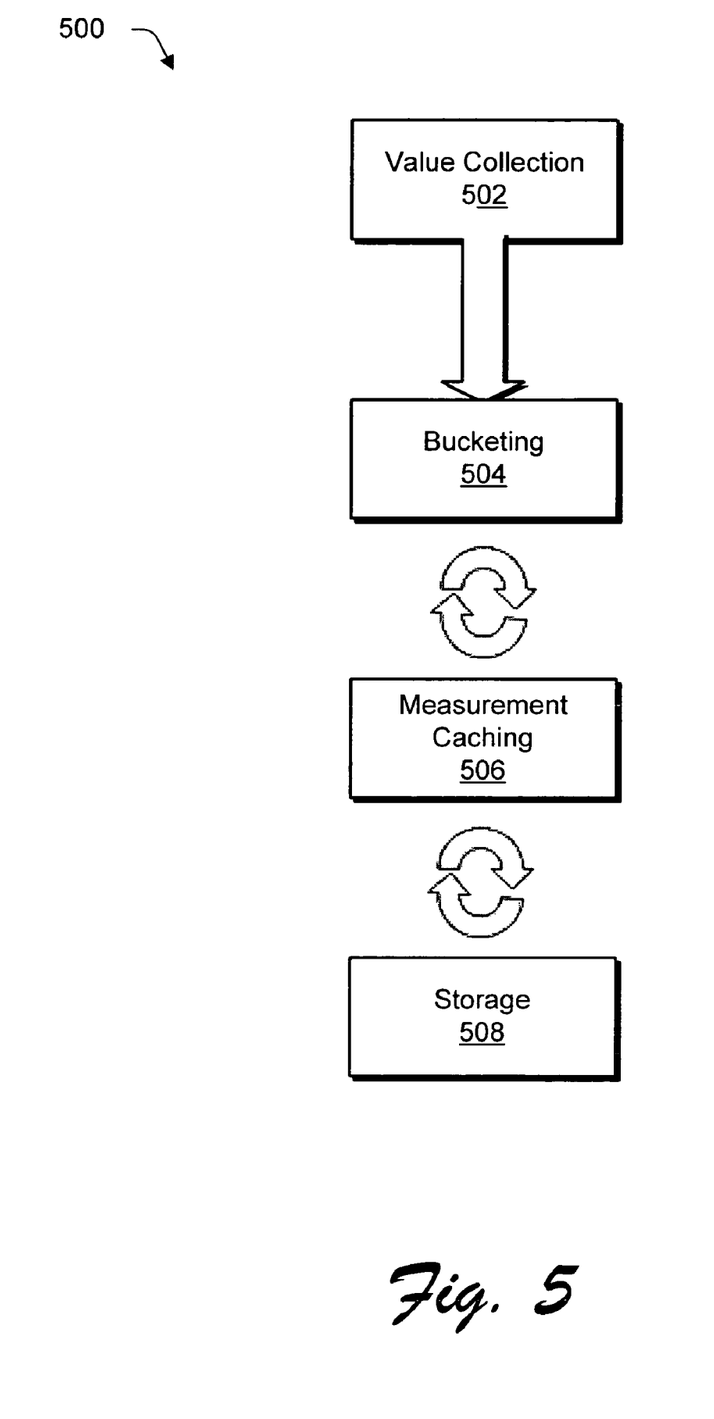
FIG. 5 is an illustration in an exemplary implementation showing a logical collection pipeline.

FIG. 5 shows an exemplary implementation of a logical collection pipeline 500. Individual measurements are collected (block 502) and bucketed (block 504), e.g. placed into the appropriate buckets. At the end of a measurement interval, the values associated with a data point are "flushed" to the measurement cache (block 506) and then reset. A separate thread then periodically flushes all collected measurements to the store via a one-way simply object access protocol (SOAP) call and empties the cache of all of the measurements that were sent to the store (block 508). This is done on a flush-interval boundary, a time period that is also configurable.

Configurations (e.g., the configuration file 204 of FIG. 2) may be set to control the number of data (one per transaction type by collecting server) generated overall and how often the calls are made to the web service. For example, the measurement interval and the flush interval may be configured. This configurable combination permits scale up of the solution nearly without limit, at the cost of granularity.

Using Variance to Make Decisions

The performance curve approach arranges collected data in discrete sets such that any given row of data, on its own, represents a complete piece of information. Compared with earlier techniques such as automated "runners" that sample by generating test transactions, the performance curve approach involving collecting curve data based on every transaction handled may yield more actionable and realistic data. Performance curves may yield comparative data that indicates the behavior of individual scale unit components relative to themselves. This self "contained-ness" may be useful in a number of ways, e.g., by being able to determine the mix of behaviors that a server farm is exhibiting, at one point in time, over a small unit of time, over large periods of time, and so on.

In another implementation, performance may be measured differently based upon additional transaction criteria such as upon the size of files involved in transactions. For example, in web email service the timing for small, medium and large messages may be handled differently. Boundaries defining the buckets for transaction types may be set differently according to message size. Separately setting boundaries accommodates different thresholds (e.g., "good" to "bad") that different message sizes may naturally incur. For example, a message with a 10 MB attachment should take longer to return to the requesting user than a 2K message with no attachments.

Accordingly, logic may be included to make the size of the data being managed a factor in the bucketing step, such as through machine learning. Large sized messages may be tracked separately from small ones, and different configuration thresholds are permitted. The logic may also be generalized such that adding size breakout categories (e.g., moderate and tiny in addition to small, medium and large) may be made with only a configuration change, e.g., a change to the configuration file 204. Naturally, the same technique may be used to add breakout capability based upon other criteria such as file type, author, location, date and so forth. With these capabilities, a day may be analyzed as a time-series for each measured curve/transaction type. The difference between the definition of the term transaction and the term curve is a matter of the degree related whether there is a size breakdown or not. Decisions can be made by analyzing the degree of variability in the data.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    taking a quality of service measurement for each of a plurality of transactions performed by a plurality of servers arranged in a server farm; and
    finding a respective one of a plurality of buckets, to which, each transaction belongs, wherein each bucket is assigned a single boundary based on settings loaded from a configuration file;
    the plurality of buckets defines a respective range of values for the measurement;
    the finding is performed by comparing the measurement with the single boundary of a respective bucket, wherein the finding is based at least in part on:
        a size of a message being processed by the transaction; and
        an amount of time for a server of the plurality of servers to open the message; and
    automatically registering new quality of service boundaries with respect to the buckets based on a monitored distribution of the quality of service measurement through modification of the configuration file.

2. A method as described in claim 1, wherein the finding includes comparing each said measurement with one or more bucket boundaries and further comprising incrementing a respective one of a plurality of counters when a measurement fits within a range defined by at least one said bucket boundary.

3. A method as described in claim 1, further comprising publishing the counters upon completion of a measurement interval.

4. A method as described in claim 1, further comprising:
    incrementing a respective one of a plurality of counters when a measurement fits within a range of a respective said bucket;
    generating a curve describing the plurality of counters; and
    outputting the generated curve for presentation.

5. A method as described in claim 1, further comprising:
    incrementing a respective one of a plurality of counters when a measurement fits within a range of a respective said bucket;
    generating a bell curve describing the plurality of counters; and
    automatically monitoring health of the storage system based on the bell curve without user intervention.

6. A method as described in claim 5, wherein the automatically monitoring is performed using pattern recognition.

7. A method as described in claim 5, wherein the automatically monitoring is performed by a core monitoring service.

8. One or more storage computer readable devices comprising computer executable instructions that, when executed using a processor, direct a computer to:
    take a quality of service measurement for each of a plurality of transactions performed by a plurality of servers arranged in a server farm;
    find a respective one of a plurality of buckets, to which, each of a plurality of transactions belongs that are performed by the server farm, wherein each said bucket defines a respective range of values for a quality of service measurement, wherein the range of values is based on settings loaded from a configuration file, and wherein the finding is based at least in part on an amount of time to log out from a web-based service;
    generate a bell curve describing the plurality of buckets;
    automatically register new quality of service boundaries with respect to the buckets based on a monitored distribution of the quality of service measurement through modification of the configuration file; and
    automatically monitor health of the server farm based on the bell curve without user intervention.

9. One or more storage computer readable devices as described in claim 8, wherein the plurality of transactions include every transaction performed by the server farm over a measurement interval.

10. One or more storage computer readable devices media as described in claim 8, wherein the respective one of the plurality of buckets is found by comparing the measurement with a single boundary of a respective said bucket.

11. One or more storage computer readable devices as described in claim 10, wherein the computer executable instructions further cause the computer to:
    increment a respective one of a plurality of counters when a measurement fits within a range of a respective said bucket; and
    generate a curve describing the plurality of counters; and
    output the generated curve for presentation.

12. One or more storage computer readable devices as described in claim 8, wherein the computer executable instructions further cause the computer to:
increment a respective one of a plurality of counters when a measurement fits within a range of a respective said bucket.

13. A method comprising:
taking a quality of service measurement for each of a plurality of customer transactions performed by a plurality of servers arranged in a server farm; and
finding a respective one of a plurality of buckets, to which, each customer transaction belongs, wherein each bucket is assigned a single boundary based on settings loaded from a configuration file, the plurality of buckets defines a respective range of values for the measurement;
the finding is performed by comparing the measurement with the single boundary of a respective bucket, wherein the finding is based on an amount of time to log out from the a web-based service; and
incrementing one of a plurality of counters associated with each bucket through modification of the configuration file when the quality of service measurement exceeds a value for the single boundary.

14. A method comprising:
taking a quality of service measurement for each of a plurality of transactions performed by a plurality of servers arranged in a server farm; and
finding a respective one of a plurality of buckets, to which, each transaction belongs, wherein each bucket is assigned a single boundary based on settings loaded from a configuration file, the plurality of buckets defines a respective range of values for the measurement;
the finding is performed by comparing the measurement with the single boundary of a respective bucket, wherein the finding is based on:
an amount of time for one or more of the servers to find a file; and
an amount of time for one or more of the servers to delete the file;
incrementing one of a plurality of counters associated with each bucket through modification of the configuration file when the quality of service measurement exceeds a value for the single boundary.

\* \* \* \* \*